(12) United States Patent
Skura et al.

(10) Patent No.: US 10,544,687 B2
(45) Date of Patent: Jan. 28, 2020

(54) SHROUDED BLADE OF A GAS TURBINE ENGINE

(71) Applicant: MTU Aero Engines AG, Munich (DE)

(72) Inventors: Krzysztof Skura, Majdan Krolewski (PL); Piotr Lebiedowicz, Hrubieszow (PL); Marek Szponar, Ksiezpol (PL)

(73) Assignee: MTU Aero Engines AG, Munich (DE)

( * ) Notice: Subject to any disclaimer, the term of this patent is extended or adjusted under 35 U.S.C. 154(b) by 212 days.

(21) Appl. No.: 15/645,021

(22) Filed: Jul. 10, 2017

(65) Prior Publication Data
US 2018/0016918 A1   Jan. 18, 2018

(30) Foreign Application Priority Data
Jul. 13, 2016  (EP) ..................... 16179245

(51) Int. Cl.
    *F01D 5/22*     (2006.01)
    *F01D 11/00*    (2006.01)
    *F01D 5/16*     (2006.01)

(52) U.S. Cl.
    CPC ............ *F01D 5/225* (2013.01); *F01D 11/003* (2013.01); *F01D 5/16* (2013.01); *F05D 2250/13* (2013.01); *F05D 2270/114* (2013.01); *Y02T 50/671* (2013.01)

(58) Field of Classification Search
    CPC ........ F01D 5/143; F01D 5/225; F01D 11/003; F01D 5/16; F01D 2250/13; F01D 2270/114; Y02T 50/671
    USPC ........................................ 416/192
    See application file for complete search history.

(56) References Cited

U.S. PATENT DOCUMENTS

| | | | | |
|---|---|---|---|---|
| 3,377,050 A * | 4/1968 | Guy | .................. | F01D 5/225 |
| | | | | 416/191 |
| 5,971,710 A * | 10/1999 | Stauffer | .................. | B23P 6/002 |
| | | | | 415/118 |
| 7,527,477 B2 * | 5/2009 | Norton | .................... | F01D 5/225 |
| | | | | 29/889.2 |

(Continued)

FOREIGN PATENT DOCUMENTS

| EP | 1451446 A1 | 3/2013 |
|---|---|---|
| EP | 3034789 A1 | 6/2016 |
| JP | S5847104 A | 3/1983 |

*Primary Examiner* — Justin D Seabe
*Assistant Examiner* — Brian Christopher Delrue
(74) *Attorney, Agent, or Firm* — Barlow, Josephs & Holmes, Ltd.

(57) ABSTRACT

The present invention relates to an improved cast-to-size gas turbine blade comprising a blade tip shroud with a stiffening rib extending outwardly from the section of the outer side of the shroud platform located between the upstream sealing fin and the upstream edge. The stiffening rib having substantially planar top surface in form of a trapezium, and two sloping sidewalls extending between the upstream sealing fin and the upstream edge on each side of the top surface and connecting said top surface with adjacent surface of the outer side of the shroud platform. The form of the stiffening rib allows to obtain an improved shroud configuration of reduced overall blade mass, capable of providing sufficient stiffening of the shroud, reducing vibrations of the shroud platform, creep curling of the shroud edges and bending stress at the intersection of the airfoil and of the shroud.

6 Claims, 2 Drawing Sheets

(56) References Cited

U.S. PATENT DOCUMENTS

| | | | | |
|---|---|---|---|---|
| 7,722,329 B2* | 5/2010 | Clarke | ............... | F01D 5/141 |
| | | | | 416/223 R |
| 8,192,166 B2* | 6/2012 | Beeck | ............... | F01D 11/08 |
| | | | | 415/173.6 |
| 9,464,529 B2* | 10/2016 | Zambetti | ............... | F01D 5/225 |
| 9,879,550 B2* | 1/2018 | Plante | ............... | F01D 5/225 |
| 9,963,980 B2* | 5/2018 | Negri | ............... | F01D 5/225 |
| 10,400,610 B2* | 9/2019 | Zemitis | ............... | F01D 5/20 |
| 2005/0186079 A1* | 8/2005 | Ingistov | ............... | F01D 5/225 |
| | | | | 416/223 R |
| 2012/0070309 A1* | 3/2012 | Zambetti | ............... | F01D 5/225 |
| | | | | 416/97 R |
| 2012/0195766 A1* | 8/2012 | Cohin | ............... | F01D 5/225 |
| | | | | 416/241 A |
| 2013/0000309 A1* | 1/2013 | Dierberger | ............... | F23R 3/002 |
| | | | | 60/752 |
| 2015/0017003 A1* | 1/2015 | Shaffer | ............... | F01D 5/225 |
| | | | | 416/182 |
| 2015/0147156 A1* | 5/2015 | Care | ............... | F01D 21/045 |
| | | | | 415/9 |
| 2015/0369058 A1* | 12/2015 | Negri | ............... | F01D 5/225 |
| | | | | 416/241 R |
| 2016/0016227 A1* | 1/2016 | Klein | ............... | F01D 5/225 |
| | | | | 428/583 |
| 2016/0032733 A1* | 2/2016 | Plante | ............... | F01D 5/225 |
| | | | | 416/189 |
| 2017/0114645 A1* | 4/2017 | Chouhan | ............... | F01D 5/02 |
| 2017/0114648 A1* | 4/2017 | Chouhan | ............... | F01D 5/02 |

* cited by examiner

SHROUDED BLADE OF A GAS TURBINE ENGINE

BACKGROUND OF THE INVENTION

The present invention generally relates to gas turbine engine's shrouded blades, and more particularly, to substantially planar ribs used with gas turbine engine shrouded blades.

Gas turbine blades are rotating airfoil shaped components in series of stages designed to convert thermal energy from a combustor into mechanical work of turning a rotor. Performance of a turbine can be enhanced by sealing the outer edge of the blade tip to prevent combustion gases from detouring from the flowpath to the gaps between the blade tip and the inner casing. A common manner for sealing the gap between the turbine blade tips and the turbine casing is through blade tip shrouds. Accordingly, a typical turbine blade has: (i) a root that adapts the blade to be secured in an interlocking manner to a rotatable disc so that the blade extends radially outwardly from the disc, (ii) a platform adjacent to the root, (iii) a shroud radially spaced apart from the platform and (iv) an airfoil extending between the platform and the shroud. For reference purposes, the shroud located at a tip of the airfoil is said to be radially outward of the airfoil (and thus is often called an outer shroud), while the root is radially inward of the airfoil.

Not only do shrouds enhance turbine performance by reducing tip leakage loss, but they serve as a vibration preventing element. The shroud acts as a mechanism to change the blade natural frequency and in turn minimizes failures due to extended resonance time of the blade at a natural frequency.

While providing airfoils with outer shrouds contributes to general improvement of the turbine blades in numerous applications, it inevitably increases the centrifugal load on the turbine, thereby causing higher stresses in the airfoil. During operation, the turbine blades spin on a disc, about the engine axis. An exemplary typical industrial application includes a disc speeding at 3,600 revolutions per minute (rpm), while in gas turbine engines used in aircraft field the turbine rotation speed can reach even above 14,000 rpm. The heavier the blade, the more load and stresses are found on the interface between the blade root and the disc slot, for a given rotation speed. Thus, the excessive loading on the blade root and the disc resulting from the presence of the outer shroud can reduce the overall life of each component.

Another drawback to shrouds is creep curling of the blade shrouds. Depending on the thickness of the shroud, the shroud edges can curl up at their ends and introduce severe bending stresses in the fillets between the shroud and blade tip. Shrouds curl due to the bending load on the edges of the shroud from gas pressure loads as well as centrifugal loads. While a known way to improve the shroud resistance to curling is to increase the section thickness of the shroud uniformly, thereby producing a stiffer shroud, this involves additional weight being added to the shroud.

Yet further, the tangential extension from the airfoil supporting such an outer shroud may generate a bending stress at the intersection of the airfoil and of the shroud. In order to reduce the stress concentration at the airfoil at the shroud intersection, fillets of variable radius have been used. However, such fillets may result in a reduction of the flow area.

Providing gas turbine engine shrouded blades with acceptable levels of structural properties, including the ability to withstand imposed centrifugal loads and to maintain sealing capabilities, remains the area of constant interest and development. Some existing systems have various shortcomings relative to certain applications.

For example, US 2016/0032733 A1 discloses a turbine blade comprising an airfoil provided at its tip with an outer shroud and at least one gusset defined by a plateau projecting in a radial inward direction from the main inner surface of the shroud, i.e. the surface of the shroud being radially inward, facing the toward an axis of the turbine.

Further, U.S. Pat. No. 5,971,710 discloses a turbine blade for a gas turbine engine, said blade including a permanent machining datum extending radially from a pocket in the outer shroud of the blade. The datum is spaced from a sidewall of the pocket so that the datum is peripherally continuous irrespective of whether the blade is in a prefinished state or in a completely finished state. Since the datum's peripheral continuity survives the original manufacturing process, the datum is available for use in post-manufacturing inspection and repair operations.

Yet further, EP 1 451 446 B1 discloses a gas turbine blade having a blade tip shroud with tapered shroud pockets to remove excess weight from the shroud while not compromising shroud bending stresses. The resulting rib created between the tapered pockets provides a surface, away from possible areas of stress concentration, for drilling radial cooling holes. The rib also slightly extends beyond the knife edge but does reach the aft edge of the outer shroud.

US 2015/0017003 A1 discloses a gas turbine engine blade provided at its radially outer portion with a shroud. At its outer surface the shroud is provided with a thickened stiffener placed in a central portion of the shroud and elevated in the outwardly radial direction from this surface. The height of the thickened stiffener decreases to the circumferential sides of the outer shroud. Apart from a single specific embodiment, wherein the stiffener has cross-section of a circular segment, no preference is given to any specific geometry and/or relative dimensions of the shroud and/or the stiffener.

An exemplary method of producing a blade is casting process. Casting is a manufacturing process by which a liquid material—including in particular a metal/a metallic alloy in a liquid phase—is usually poured into a mould, which contains a hollow cavity of the desired shape, and then allowed to solidify. Customary methods require expensive machining, such as grinding of the outer part of the shroud platform to keep tight tolerances required in such high-performance elements like turbine blades.

Accordingly, there is a constant need to further improve outer shroud configuration, especially aimed at reduction of overall blade mass, which in turn would reduce the amount of pull on the turbine disc, increasing the life of both the turbine blade root and corresponding disc locations. Further, such improved shroud configuration should preferably have positive impact on shroud platform vibrational properties and at the same time provide sufficient stiffening of the shroud, so that it could withstand normal operation conditions with little or no creep curling of the shroud edges or bending stress at the intersection of the airfoil and of the shroud. Yet further, no change of the shroud configuration should lead to undesired reduction of the flow area. Finally, reducing or preferably eliminating the need for expensive machining of the outer side of the shroud platform would greatly reduce the overall costs and time of blade production.

As it is well known to those skilled in the art, any slight modification of the configuration of the shroud elements may have significant impact on the natural frequency of each single blade, or—once the entire set of blades of the turbine is heated up during operation—the natural frequency of the entire turbine. Due to extremely high complexity of mechanical phenomena occurring during the turbine blades performance and grate number of factors to be taken into account (such as blade material characteristics, flow characteristics, thermal behaviour, operating parameters of the turbine . . . ) it is impossible to anticipate without extensive study and complex calculations whether a given configuration of a shroud would bring any improvement in at least one of the areas mentioned above or vice versa. Therefore, the development of a new shroud design is costly and requires highly qualified engineers and access to expensive analytic programs, that perform complex numerical analysis, not to the mention a great amount of time needed for the overall process, often including further experimental verification.

SUMMARY OF THE INVENTION

The aim of the present solutions was to provide a shroud configuration with reduced overall blade mass, said configuration being at the same time capable of providing sufficient stiffening of the shroud, reducing vibrations of the shroud platform, creep curling of the shroud edges and bending stress at the intersection of the airfoil and of the shroud. Another aim was to reduce or preferably eliminate expensive machining of the outer side of the shroud platform by providing a configuration that could be manufactured with sufficient precision directly in casting process.

These aims have been achieved by the present invention. Namely, after extensive studies, calculations and tests, it has been found that providing certain section of the outer surface of the shroud platform (i.e. the surface facing the housing of the turbine blade set) with a cast-to-size substantially planar stiffening rib allows to effectively reduce vibrations of the shroud platform, provides sufficient stiffness of the shroud platform and involves a minimum weight impact on the whole shroud platform compared to shroud platform not bearing such a rib.

Accordingly, the present invention is related to a cast-to-size turbine blade that includes a root section, a platform section of generally planar shape connected to said root section, an airfoil extending outward from said platform section, said airfoil having a platform end connected to said platform section, and a tip end opposite said platform end, a shroud extending outward from said tip end and attached thereto.

The shroud includes a shroud platform substantially perpendicular to the radial direction defined by the longitudinal axis of the airfoil, said shroud platform having an inner side facing the airfoil, an outer side opposite to the inner side, an upstream edge substantially perpendicular to the gas flow direction in the turbine; a downstream edge, opposite to and substantially parallel to the upstream edge, a number of radially extending sidewalls, generally perpendicular to and connecting the inner and outer sides of the shroud platform. An upstream sealing fin along the upstream edge extending outwardly in from the outer side of the shroud platform, extending across said outer side and having ends at said sidewalls and a downstream sealing fin along the downstream edge extending outwardly in from the outer side of the shroud platform, extending across said outer side and having ends at said sidewalls. A stiffening rib extends outwardly from the section of the outer side of the shroud platform located between the upstream sealing fin and the upstream edge, the stiffening rib having substantially planar top surface in form of a trapezium, and two sloping sidewalls extending between the upstream sealing fin and the upstream edge on each side of the top surface and connecting said top surface with adjacent surface of the outer side of the shroud platform.

In one preferred aspect of the invention the elevation of the top surface of the stiffening rib above the adjacent surface of the outer side of the shroud platform is constant along its entire length between the upstream sealing fin and the upstream edge.

In one preferred aspect of the invention the elevation of the top surface of the stiffening rib above the adjacent surface of the outer side of the shroud platform is comparatively small compared to the thickness of the shroud platform at the adjacent surface of the outer side of the shroud platform. Preferably this elevation is between 5% and 50% of the before mentioned thickness, more preferably between 20% an 50%.

In another preferred aspect of the invention the elevation of the top surface of the stiffening rib above the adjacent surface of the outer side of the shroud platform ranges from 0.1 mm to 0.2 mm, and even more preferably is 0.1524 mm (=0.006").

In yet another preferred aspect of the invention the width of the top surface of the stiffening rib at the upstream edge ranges from 9 mm to 10 mm, while the width of the top surface of the stiffening rib at the upstream sealing fin ranges from 14 mm to 15 mm.

Further to the effects mentioned above, the shroud platform configuration according to the invention including the substantially planar stiffening rib allows to optimize costs of manufacture of the blade, as the rib is formed in a cast-to-size form during the casting of the entire blade, and no further machining operations are required to further shape the rib. Yet further, the relatively small elevation of the planar top surface above the adjacent surface of the outer side of the shroud platform allows to keep minimum sealing fin axial distance, thereby optimizing the castability, weight and accurateness of casting.

BRIEF DESCRIPTION OF THE DRAWINGS

Exemplary embodiments of the invention are described with reference to the following figures, which are provided for the purpose of illustration only, the full scope of the invention being set forth in the claims that follow.

DESCRIPTION OF THE INVENTION

The cast-to-size turbine blade according to the invention comprises: a not-shown root section; a not-shown platform section of generally planar shape connected to said root section; an airfoil 4 extending outward from said platform section, said airfoil 4 having a platform end connected to said platform section, and a tip end opposite said platform end; and a shroud 5 extending outward from said tip end and attached thereto.

Figure 1:
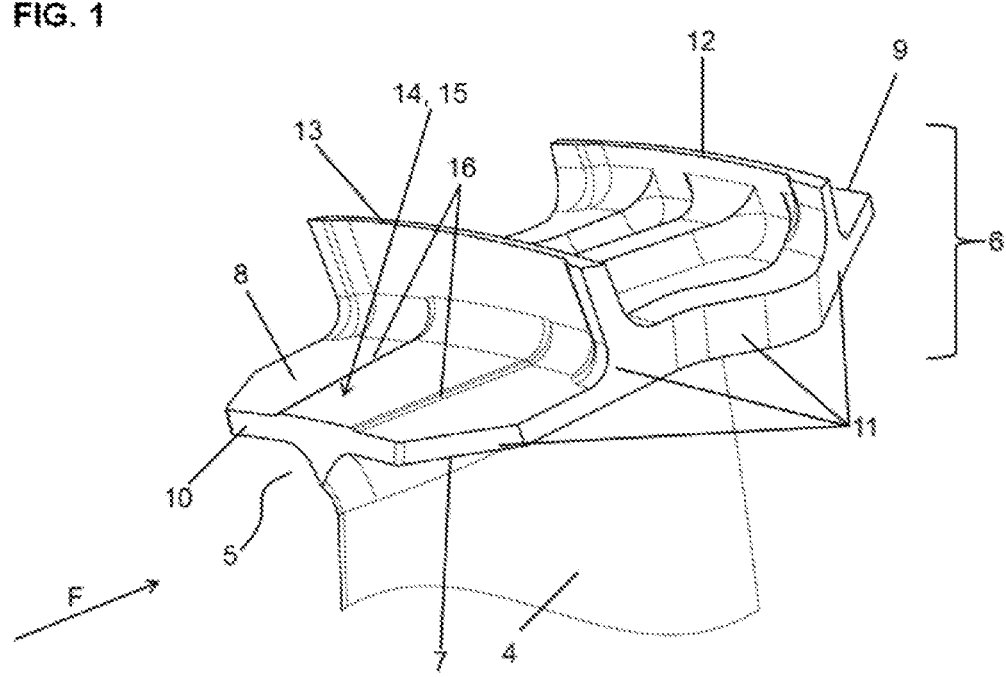
FIG. 1 is a perspective view of the shroud of a turbine blade according to the present invention.
Figure 2:
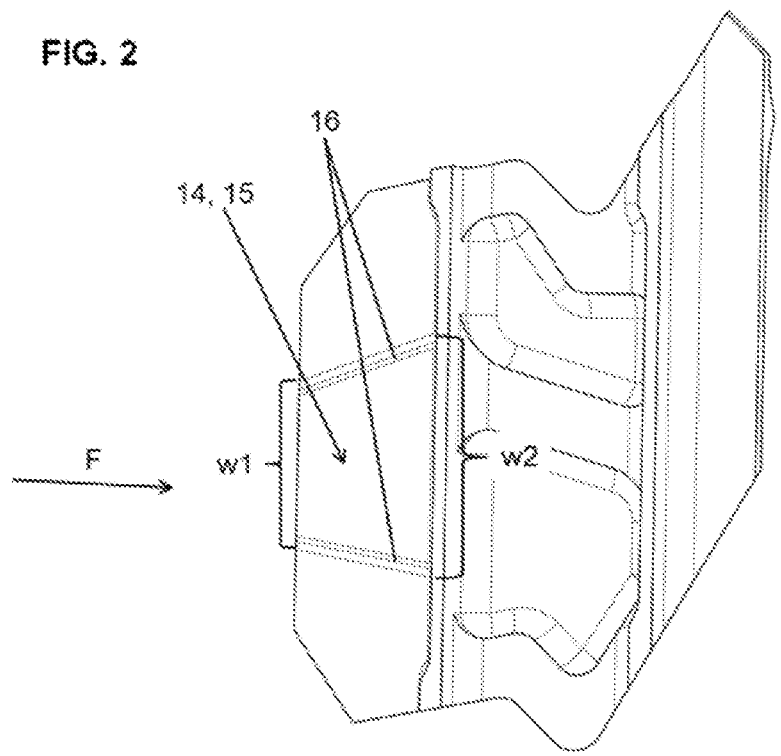
FIG. 2 is a top elevational view of the shroud of FIG. 1.

The shroud 5 is presented in greater detail in FIGS. 1 and 2 comprises a shroud platform 6 substantially perpendicular to the radial direction defined by the longitudinal axis of the airfoil 4. Said shroud platform 6 has: an inner side 7 facing the airfoil 4; an outer side 8 opposite to the inner side 7; an upstream edge 10 substantially perpendicular to the gas flow direction F in the turbine; a downstream edge 9, opposite to and substantially parallel to the upstream edge 10; a plurality of radially extending sidewalls 11, generally perpendicular to and connecting the inner and outer sides 7, 8 of the shroud platform 6. Another feature of the shroud 5 is a downstream sealing fin 12 along the downstream edge 9 extending outwardly from the outer side 8 of the shroud platform 6, extending across said outer side 8 and having ends at said sidewalls 11. Further, the shroud 5 also comprises an upstream sealing fin 13 along the upstream edge 10 extending outwardly from the outer side 8 of the shroud platform 6, extending across said outer side 8 and having ends at said sidewalls 11. Moreover, the shroud 5 comprises a stiffening rib 14 extending outwardly from the section of the outer side 8 of the shroud platform 6 located between the upstream sealing fin 13 and the upstream edge 10. The stiffening rib 14 has substantially planar top surface 15 in form of a trapezium (see in particular FIG. 2), and two sloping sidewalls 16 extending between the upstream sealing fin 13 and the upstream edge 10 on each side of the top surface 15. The sloping sidewalls 16 connect the top surface 15 with adjacent surface of the outer side 8 of the shroud platform 6.

Figure 3:
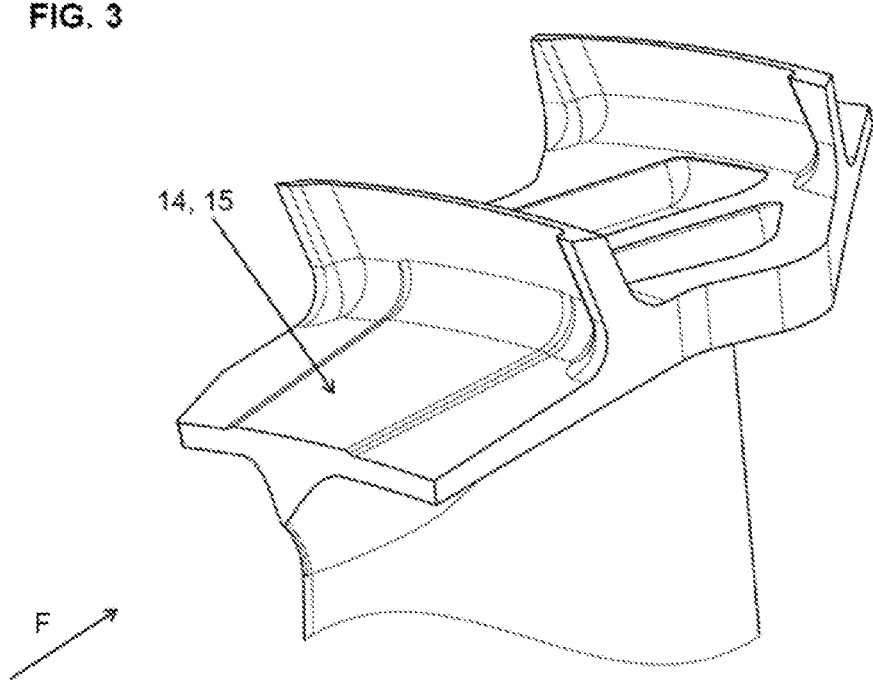
FIG. 3 is a perspective view of the shroud according to a second embodiment of the present invention.
Figure 4:
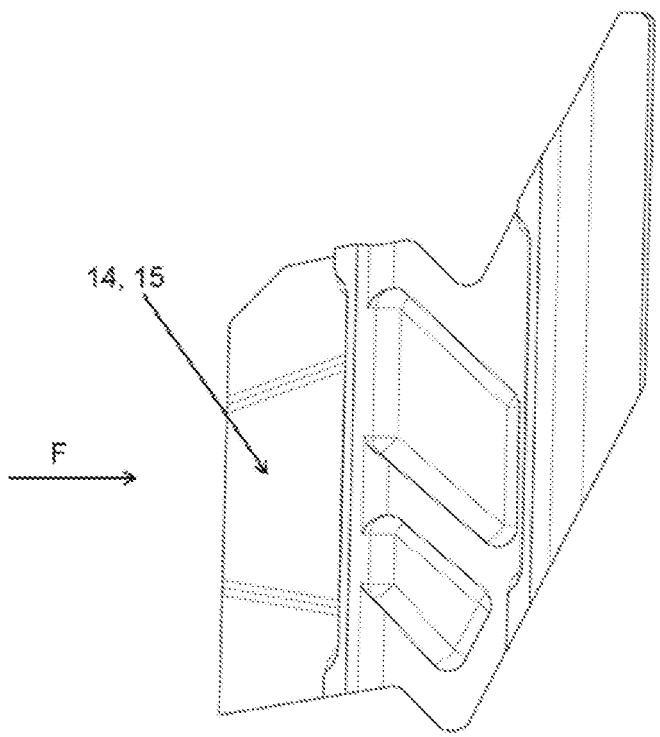
FIG. 4 is a top elevational view of the shroud of FIG. 3.

Similar configuration of the outer shroud 5 including the same elements has been shown in FIGS. 3 and 4. This configuration differs from the one described above in: (i) the shape of shallow recessed pockets formed in the surface section of the outer side 8 of the shroud platform 6 between the downstream edge 9 and the upstream edge 10; (ii) the shape of sidewalls 11; and (iii) the proportion of the area covered by the stiffening rib (14) to the remaining area of the surface section of the outer side 8 of the shroud platform 6 extending between the upstream edge 10 and the upstream sealing fin 13.

Example 1

A model turbine blade having the outer shroud 5 configuration as shown in FIGS. 1 and 2, and designed for use in PW812 B4/B5 turbofan jet engine was manufactured in a customary casting process from nickel based alloy. The shallow cast-to-size stiffening rib 14 was formed with a constant elevation of the top surface 15 of the stiffening rib 14 above the adjacent surface of the outer side 8 of the shroud platform 6 along its entire length between the upstream sealing fin 13 and the upstream edge 10. The elevation (height) of the stiffening rib 14 was 0.006"=0.1524 mm. The width w1 of the top surface 15 of the stiffening rib 14 at the upstream edge 10 ranges from 9 mm to 10 mm, while the width w2 of the top surface 15 of the stiffening rib 14 at the upstream sealing fin 13 ranges from 14 mm to 15 mm.

The model blade was subsequently analyzed by structures. The mass of the stiffing rib 14 is between 0.08% and 0.12% of the mass of the overall blade, preferably about 0.1% thereof.

Example 2

A model turbine blade having the outer shroud 5 configuration as shown in FIGS. 3 and 4 was manufactured in a similar manner as in Example 1. The elevation (height) of the stiffening rib 14 was constant along its entire length and was 0.17 mm. The width w1 of the top surface 15 of the stiffening rib 14 at the upstream edge 10 ranges from 13 mm to 16 mm, while the width w2 of the top surface 15 of the stiffening rib 14 at the upstream sealing fin 13 ranges from 18 mm to 21 mm.

The model blade was subsequently analyzed by structures. Also in this example, the mass of the stiffing rib 14 is between 0.08% and 0.12% of the mass of the overall blade, preferably about 0.1% thereof.

While the invention has been described in what is known as presently preferred embodiment, it is to be understood that the invention is not to be limited to the disclosed embodiment but, on the contrary, is intended to cover various modifications and equivalent arrangements within the scope of the following claims.

What is claimed is:

1. A cast-to-size turbine blade, comprising:
   a root section;
   a platform section of planar shape connected to said root section;
   an airfoil extending outward from said platform section, said airfoil having a platform end connected to said platform section, and a tip end opposite said platform end;
   a shroud extending outward from said tip end and attached thereto, the shroud comprising:
      a shroud platform perpendicular to the radial direction defined by the longitudinal axis of the airfoil, said shroud platform having: an inner side facing the airfoil; an outer side opposite to the inner side; an upstream edge perpendicular to the gas flow direction (F) in the turbine; a downstream edge, opposite to and parallel to the upstream edge; a plurality of radially extending sidewalls, perpendicular to and connecting the inner and outer sides of the shroud platform;
      an upstream sealing fin along the upstream edge extending outwardly from the outer side of the shroud platform, extending across said outer side and having ends at said sidewalls;
      a downstream sealing fin along the downstream edge extending outwardly from the outer side of the shroud platform, extending across said outer side and having ends at said sidewalls; and
      a stiffening rib extending outwardly from the section of the outer side of the shroud platform located between the upstream sealing fin and the upstream edge, said stiffening rib having planar top surface in form of a trapezium, and two sloping sidewalls extending between the upstream sealing fin and the upstream edge on each side of the top surface and connecting said top surface with adjacent surface of the outer side of the shroud platform,
   wherein the two sloping sidewalls are arranged such that the width of the top surface of the stiffening rib at the upstream edge is smaller than the width of the top surface of the stiffening rib at the upstream sealing fin.

2. The turbine blade according to claim 1, wherein the elevation of the top surface of the stiffening rib above the adjacent surface of the outer side of the shroud platform is constant along its entire length between the upstream sealing fin and the upstream edge.

3. The turbine blade according to claim 1, wherein the elevation of the top surface of the stiffening rib above the adjacent surface of the outer side of the shroud platform ranges from 0.15 mm to 0.17 mm.

4. The turbine blade according to claim 3, wherein the elevation of the top surface of the stiffening rib above the adjacent surface of the outer side of the shroud platform is 0.1524 mm.

5. The turbine blade according to claim 1, wherein the width of the top surface of the stiffening rib at the upstream edge ranges from 9 mm to 16 mm, while the width of the top surface of the stiffening rib at the upstream sealing fin ranges from 14 mm to 21 mm.

6. The turbine blade according to claim 1, wherein the elevation of the top surface of the stiffening rib above the adjacent surface of the outer side of the shroud platform ranges from 5% to 50% of the thickness of the shroud platform at the adjacent surface of the outer side of the shroud platform.

* * * * *